(No Model.)

E. H. DRAKE.
MOTIVE POWER.

No. 253,018. Patented Jan. 31, 1882.

WITNESSES:
C. Neveux
C. Sedgwick

INVENTOR:
E. H. Drake
BY Munn & Co
ATTORNEYS.

UNITED STATES PATENT OFFICE.

EDGAR H. DRAKE, OF NEWFIELD, NEW YORK.

MOTIVE POWER.

SPECIFICATION forming part of Letters Patent No. 253,018, dated January 31, 1882.

Application filed July 25, 1881. (No model.)

*To all whom it may concern:*

Be it known that I, EDGAR H. DRAKE, of Newfield, in the county of Tompkins and State of New York, have invented an Improved Motive Power, of which the following is a specification.

The object of this invention is to provide a novel combination of simple and well-known mechanisms for applying power for domestic and other purposes.

The invention consists of a combination of shafts, cranks, pinions, cog-wheels, eccentrics, pitmen, walking-beams, connecting-rods, treadle, &c., supported in a suitable frame, whereby power may be applied by hand, foot, or weights to operate a saw, churn, washing-machine, &c., all of which will be hereinafter set forth.

Figure 1:
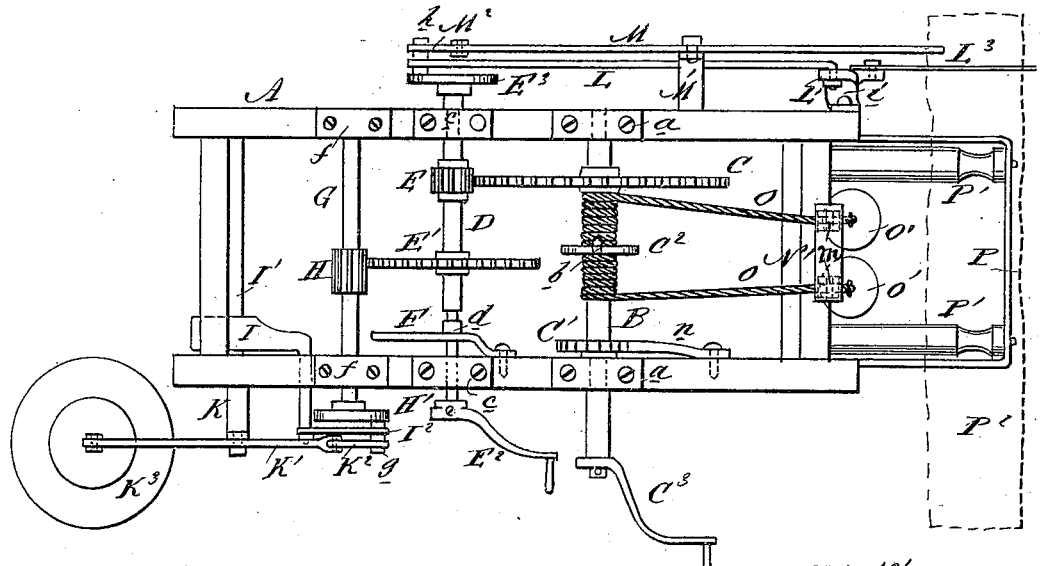
Figure 2:
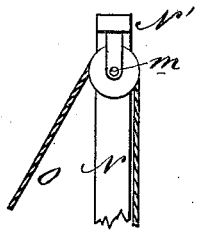
Figure 2:
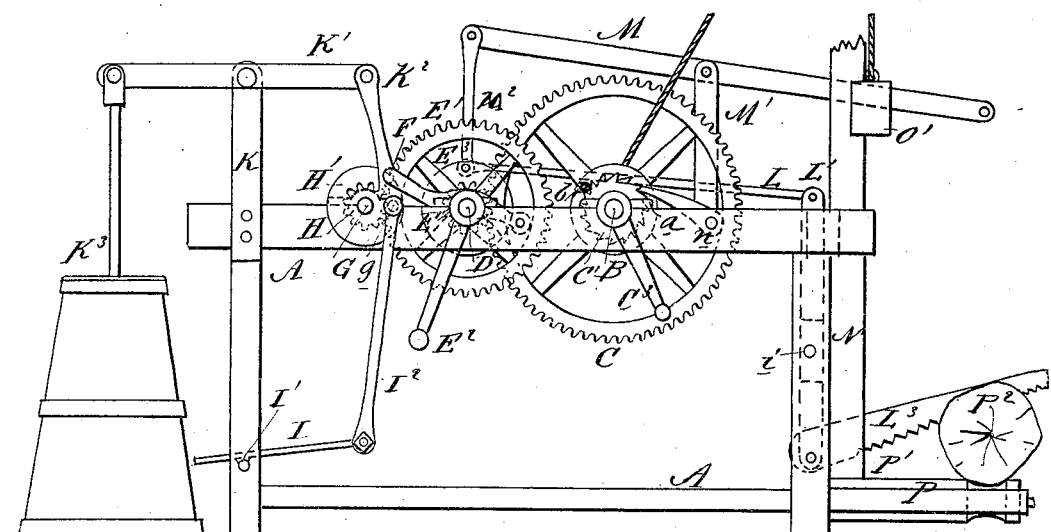

Figure 1 is a plan of the device. Fig. 2 is a side elevation of the same.

Similar letters of reference indicate corresponding parts.

In the drawings, A represents the frame supporting the mechanism, across the top of which, in boxes $a\,a$, is journaled a shaft, B, having keyed on it a large cog-wheel, C, a ratchet-wheel, C', and a disk or collar, $C^2$, having a peripheral slot, $b$, and on one end of said shaft B is a crank, $C^3$, the functions of each of which will be hereinafter set forth. In rear of this shaft B, and parallel with it, on the top of the frame A, a shaft, D, is journaled in boxes $c\,c$ in such a manner that it may be moved endwise, if desired; and on this shaft D are keyed a pinion, E, meshing with the cog-wheel C, and a cog-wheel, E', meshing with a pinion, H, on the shaft G. A collar, $d$, is formed on this shaft D by turning down said shaft on either side of it, so that when said shaft D is moved endwise to throw the pinion E in gear with the wheel C the dog F, which is pivoted on a side of the frame A, may be engaged over said shaft D on one side of said collar $d$, and hold said shaft in position, as shown in Fig. 1; and if the said shaft D be moved so as to throw the pinion E out of gear with the wheel C, said dog F will be engaged on the opposite side of the collar $d$ and hold said pinion E out of gear. On one end of said shaft D is a crank, $E^2$, and on the other end is an eccentric, $E^3$, whose functions will be hereinafter set forth.

In rear of and parallel with the shaft D a shaft, G, is journaled in boxes $f\,f$, and has keyed on it a pinion, H, with which the cog-wheel E' meshes, and on one end of said shaft G is an eccentric, H', provided with a wrist-pin, $g$, which is connected with a treadle, I, pivoted on a transverse shaft, I', by means of a pitman, $I^2$, so that by operating the said treadle I the shafts G D B and their connections can all be put in motion.

On the side of the frame A, near the rear end thereof, is secured an upright standard, K, on which is pivoted a walking-beam, K', whose one end is connected with the eccentric-pin $g$ by means of a vertical pitman, $K^2$, while the other end of said walking-beam K' is designed to be connected with a churn, as indicated at $K^3$, washing-machine, or other machine, to operate the same.

The eccentric $E^3$ on the shaft D is provided with a pin, $h$, on which is pivoted a connecting-rod, L, that extends horizontally forward, and is also pivoted to the upper end of a lever, L', which is pivoted on the side of the frame A, as shown at $i$, whereby a horizontal cross-cut-saw, that is designed to be attached to the lower end of said lever L', as indicated at $L^3$, may be operated.

On the side of the frame A is secured an upright standard, M', in the top of which is pivoted a walking-beam, M, one end of which is connected by a pitman, $M^2$, with the eccentric-pin $h$, while the other end is designed to be connected with a saw, churn, or other machine or tool to operate the same.

When the cog-wheel C is in gear with the pinion E, power applied to the crank $C^3$ will impart motion to the walking-beam K' to run a churn or other device, and also to the lever L' and walking-beam M to run whatever tools or machines may be connected with them, and at such time the pitman $I^2$ will be preferably disconnected from the eccentric-pin $g$; or the pinion E may be thrown out of gear with the cog-wheel C and the walking-beams K' M and lever L' be operated more slowly by power applied to the crank $E^2$. When desired, either of the walking-beams K' M or lever L' may be disconnected from their respective shafts G D, so that all the power applied shall be exerted to operate the beam or lever (and its attached tool or machine) that remains connected with this motive power.

At one end of the frame A is secured a high standard, N, from whose cross-top N' depend two pulleys, $m\ m$, through which is passed a cord or rope, O, whose bight is caught in the slot $b$ of the disk $C^2$. On the ends of this rope O are weights O', by whose gravity the mechanism of this device may be run, instead of by hand or foot, in which case it is preferable to disconnect the treadle I and cranks $C^3\ E^2$. The bight of the rope O being caught in the disk-slot $b$, the shaft B is revolved by means of the crank $C^3$ until the said rope O is wound upon the shaft B, and the weights O' thereby drawn up to the pulleys $m\ m$. During this operation a dog or pawl, $n$, which is pivoted on the inside of the frame A, is engaged in the ratchet C' to prevent the unwinding of said rope O. The pawl $n$ being then thrown out of gear with the ratchet C', the weights O' gradually descend, thereby causing the shaft B to revolve and impart motion to the mechanisms connected with it.

Attached to the frame A, at the front thereof, is an open frame, P, in which are journaled two grooved rolls, P', parallel with said frame A. These rolls P' are designed to support and facilitate the adjustment and moving of logs to be sawed, as indicated at $P^2$. Said saws connect either with the lever L' or walking-beam M.

Both the standard N and frame and rolls P P' may be separate from the frame A, but arranged or set up in a convenient location for use, in combination with the frame A and its supported mechanism.

This device is simple of construction, easy of transportation, so that it can be conveniently moved from one place to another, and possesses a great advantage over all other portable power mechanisms by enabling the operator to apply power in several convenient ways.

Having thus described my invention, I claim as new and desire to secure by Letters Patent—

1. A motive-power mechanism constructed substantially as herein shown and described, consisting of shaft B, carrying cog-wheel, ratchet-wheel, and crank C C' $C^3$, sliding shaft D, carrying pinion, cog-wheel, crank, and eccentric E E' $E^2$ $E^3$, shaft G, carrying pinion and eccentric H H', treadle, treadle-shaft, and pitman I I' $I^2$, standard, walking-beam, and pitman K K' $K^2$, connecting-rod and lever L L', and standard, walking-beam, and pitman M' M $M^2$, all in combination, supported on frame A, and operated as set forth, whereby the machine may be simultaneously used for churning and sawing, and may be driven either by treadle or hand-cranks at fast or slow speed, as desired.

2. In a motive-power mechanism, the combination, with the frame A and shaft B and cog-wheel C, of the standard N, provided with pulleys $m\ m$, rope O, and weights O', substantially as herein shown and described, whereby the mechanism may be operated by said weights, as set forth.

3. In a motive-power mechanism, the combination, with the shaft D, carrying cog-wheel, crank, and eccentric E' $E^2$ $E^3$, of the shaft G, carrying pinion and eccentric H H', and treadle, treadle-shaft, and pitman I I' $I^2$, substantially as herein shown and described, whereby the power may be applied through either crank or treadle, as set forth.

EDGAR H. DRAKE.

Witnesses:
JACOB H. ROSE,
DAVID TAYLOR.